(12) United States Patent
Ford et al.

(10) Patent No.: US 9,421,836 B1
(45) Date of Patent: Aug. 23, 2016

(54) HITCH MOUNT ASSEMBLIES INCLUDING TRAILER HITCH ADAPTER SLEEVES

(71) Applicant: Rocky Mountain Hitch LLC, Centerville, UT (US)

(72) Inventors: Dixon Ford, Fruit Heights, UT (US); Kenneth H. Carter, Fruit Heights, UT (US)

(73) Assignee: Rocky Mountain Hitch LLC, Centerville, UT (US)

( * ) Notice: Subject to any disclaimer, the term of this patent is extended or adjusted under 35 U.S.C. 154(b) by 0 days.

(21) Appl. No.: 14/794,405

(22) Filed: Jul. 8, 2015

(51) Int. Cl.
*B60D 1/30* (2006.01)
*B60D 1/36* (2006.01)
*B60D 1/48* (2006.01)

(52) U.S. Cl.
CPC .. *B60D 1/30* (2013.01); *B60D 1/36* (2013.01); *B60D 1/48* (2013.01)

(58) Field of Classification Search
CPC .................................. B60D 1/52; B60D 1/241
See application file for complete search history.

(56) References Cited

U.S. PATENT DOCUMENTS

| | | | |
|---|---|---|---|
| 2,280,662 A | 4/1942 | Pawsat | |
| 3,198,562 A | 8/1965 | Smith | |
| 5,197,349 A | 3/1993 | Herman | |
| 5,244,133 A | 9/1993 | Abbott et al. | |
| 5,251,494 A | 10/1993 | Edwards | |
| 5,333,888 A | 8/1994 | Ball | |
| 5,410,826 A | 5/1995 | Immel et al. | |
| 5,423,566 A | 6/1995 | Warrington et al. | |
| 5,685,686 A | 11/1997 | Burns | |
| 6,131,938 A * | 10/2000 | Speer | B60D 1/241 24/525 |
| 6,260,931 B1 | 7/2001 | Stewart | |
| 6,293,372 B1 | 9/2001 | Lorenz | |
| 6,382,656 B1 * | 5/2002 | Johnson, Jr. | B60D 1/06 280/506 |
| 6,834,879 B1 * | 12/2004 | Lorman | B60D 1/06 280/483 |
| 6,835,021 B1 * | 12/2004 | McMillan | B60D 1/155 280/504 |
| 7,004,491 B1 * | 2/2006 | Allsop | B60D 1/52 280/491.2 |
| 7,338,065 B1 * | 3/2008 | Clausen | B60D 1/241 280/505 |
| 7,448,640 B2 * | 11/2008 | Weaver | B60D 1/06 280/506 |
| 7,594,673 B1 * | 9/2009 | Devlin | B60D 1/50 280/304.3 |
| 7,717,455 B2 * | 5/2010 | Morris | B60D 1/07 280/491.5 |
| 7,726,681 B2 * | 6/2010 | McKendry | B60D 1/241 280/506 |
| 8,079,612 B1 * | 12/2011 | Tambornino | B60D 1/241 224/519 |
| 8,262,121 B2 | 9/2012 | Beck | |
| 9,027,950 B2 | 5/2015 | Lahn | |
| 2011/0210530 A1 * | 9/2011 | Hancock | B60D 1/02 280/506 |

OTHER PUBLICATIONS

Ford, Dixon, U.S. Appl. No. 14/503,989, filed Oct. 1, 2014, titled "Trailer Hitch Assemblies and Related Methods".

\* cited by examiner

*Primary Examiner* — Kevin Hurley
(74) *Attorney, Agent, or Firm* — TraskBritt (57) ABSTRACT

Hitch mount assemblies include a trailer hitch receiver, a hollow sleeve inserted into the trailer hitch receiver, and a hitch mount inserted into the hollow sleeve. First and second planar end surfaces of sidewalls of the hollow sleeve lie in a common plane that is oriented at an acute angle to a central longitudinal axis of the hollow sleeve. Additional hitch mount assemblies include a trailer hitch receiver, a hitch mount, and a hollow sleeve that includes a first L-shaped elongated member and a complementary second L-shaped elongated member. Further hitch mount assemblies include a trailer hitch receiver, a hitch mount including an elongated bar inserted into and extending from the trailer hitch receiver, and a hollow sleeve at least substantially fully covering the portion of the elongated bar extending from an opening of the trailer hitch receiver.

11 Claims, 8 Drawing Sheets

HITCH MOUNT ASSEMBLIES INCLUDING TRAILER HITCH ADAPTER SLEEVES

TECHNICAL FIELD

Embodiments of the present disclosure relate to hitch mounts and trailer hitch adapters for use in vehicle trailer hitch receivers and related methods.

BACKGROUND

Known non-wobble two-piece trailer hitches are described in, for example, U.S. Pat. No. 6,835,021 to McMillan, filed May 28, 2003; U.S. Pat. No. 5,423,566 to Warrington et al., filed Aug. 26, 1993; and U.S. Pat. No. 5,685,686 to Burns, filed Mar. 22, 1996, the disclosure of each of which is incorporated herein by reference. Such trailer hitches employ opposed wedge-shaped surfaces that displace one element of the two-piece shank laterally or diagonally with respect to another element of the two-piece shank to cause two or more of the elements to press against two or more internal sidewalls of a hitch receiver.

Additionally, it is known to use hitch adapters, also referred to in the art as "hitch adapter sleeves," within trailer hitch receivers to use a trailer hitch of one size with a receiver of a larger size. Such hitch adapters act as a spacer between the smaller trailer hitch and the larger receiver. However, a space may still exist between an outer surface of the hitch adapter and an inner surface of the receiver, which may result in movement of the trailer hitch within the receiver, even if a known non-wobble two-piece trailer hitch is used within the hitch adapter.

BRIEF SUMMARY

Some embodiments of the present disclosure include a hitch mount assembly, including a trailer hitch receiver, a hollow sleeve inserted into the trailer hitch receiver, and a hitch mount inserted into the hollow sleeve. The hollow sleeve includes a plurality of sidewalls including at least a first sidewall and a second sidewall. The first sidewall is oriented parallel to the second sidewall and has a first planar end surface. The second sidewall has a second planar end surface. The first and second planar end surfaces lie in a common plane oriented at an acute angle to a central longitudinal axis of the hollow sleeve. Inner surfaces of the first sidewall and second sidewall at least partially define a receiving aperture. A first hole extends through the first sidewall and a second hole extends through the second sidewall. The first and second holes are located along an axis such that a straight pin may be inserted through the first hole and the second hole.

Some embodiments of the present disclosure include a hitch mount assembly including a trailer hitch receiver, a hitch mount inserted into the trailer hitch receiver, and a hollow sleeve positioned to at least partially fill a space between an exterior surface of the hitch mount and an interior surface of the trailer hitch receiver. The hollow sleeve includes a first elongated member that is L-shaped in cross section and a complementary second elongated member that is L-shaped in cross section.

Some embodiments of the present disclosure include a hitch mount assembly that includes a trailer hitch receiver having an inner circumference and an opening, a hitch mount including an elongated bar inserted into the trailer hitch receiver, and a hollow sleeve inserted into the trailer hitch receiver and around the hitch mount. A portion of the elongated bar of the hitch mount extends from the opening of the trailer hitch receiver. The elongated bar has an outer circumference that is less than the inner circumference of the trailer hitch receiver. The hollow sleeve includes a plurality of elongated sidewalls. The hollow sleeve includes a first end surface at a first longitudinal end of the hollow sleeve, a second end surface at a second longitudinal end of the hollow sleeve, and a central longitudinal receiving aperture for receiving at least a portion of the hitch mount. The hollow sleeve at least partially protrudes from the trailer hitch receiver and at least substantially fully covers the portion of the elongated bar extending from the opening of the trailer hitch receiver.

DETAILED DESCRIPTION

The illustrations presented herein are not meant to be actual views of any hitch mount, assembly, adapter, or component thereof, but are merely simplified schematic representations employed to describe illustrative embodiments of the disclosure. The drawings are not necessarily to scale. Similar structures or components in the various drawings may retain the same or similar numbering for the convenience of the reader; however, the similarity in numbering does not mean that the structures or components are necessarily identical in size, composition, angle, shape, configuration, or other property.

As used herein, any relational term, such as "first," "second," "upper," "lower," etc., is used for clarity and convenience in understanding the disclosure and accompanying drawings, and does not connote or depend on any specific preference, orientation, or order, except where the context clearly indicates otherwise. For example, these terms may refer to an orientation of elements of the hitch mount relative to a surface on which the hitch mount may be positioned (e.g., as illustrated in the figures).

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "longitudinal" means along a length of the hitch mount extending from a tongue of the hitch mount to a distal end of the hitch mount opposite the tongue, which distal end is configured for insertion into a trailer hitch receiver of a vehicle.

Some embodiments of the present disclosure include hitch mounts having a first tubular element and a second tubular element that can be diagonally and laterally displaced and misaligned relative to each other to improve a fit of the hitch mount within a trailer hitch receiver. In other words, when first and second tubular elements of the hitch mount are diagonally and laterally displaced and misaligned relative to each other, portions of the first and second tubular elements may press against interior walls of the trailer hitch receiver to create a more secured fit and to improve stability and decrease movement of the hitch mount within the trailer hitch receiver. Some embodiments of the present disclosure include such hitch mounts attached to trailer hitch accessories such as, for example, a luggage rack. Some embodiments of the present disclosure include trailer hitch adapters that include a sleeve sized and shaped to at least partially fill a space between a hitch mount and a trailer hitch receiver. The sleeve may be a single unitary piece or a plurality of pieces that are aligned together to form the sleeve. Some embodiments of the present disclosure include a sleeve that covers at least substantially all of a tubular portion of the hitch mount such that trailer hitch attachments (e.g., mud flaps) designed to engage around larger hitch mounts may be coupled to smaller hitch mounts by utilizing the sleeve. Additional embodiments of the present disclosure include a sleeve that does not cover a portion of the hitch mount extending out of the receiver, such that smaller hitch mounts and attachments designed to engage around the smaller hitch mounts can be used together with a larger trailer hitch receiver.

Figure 1:
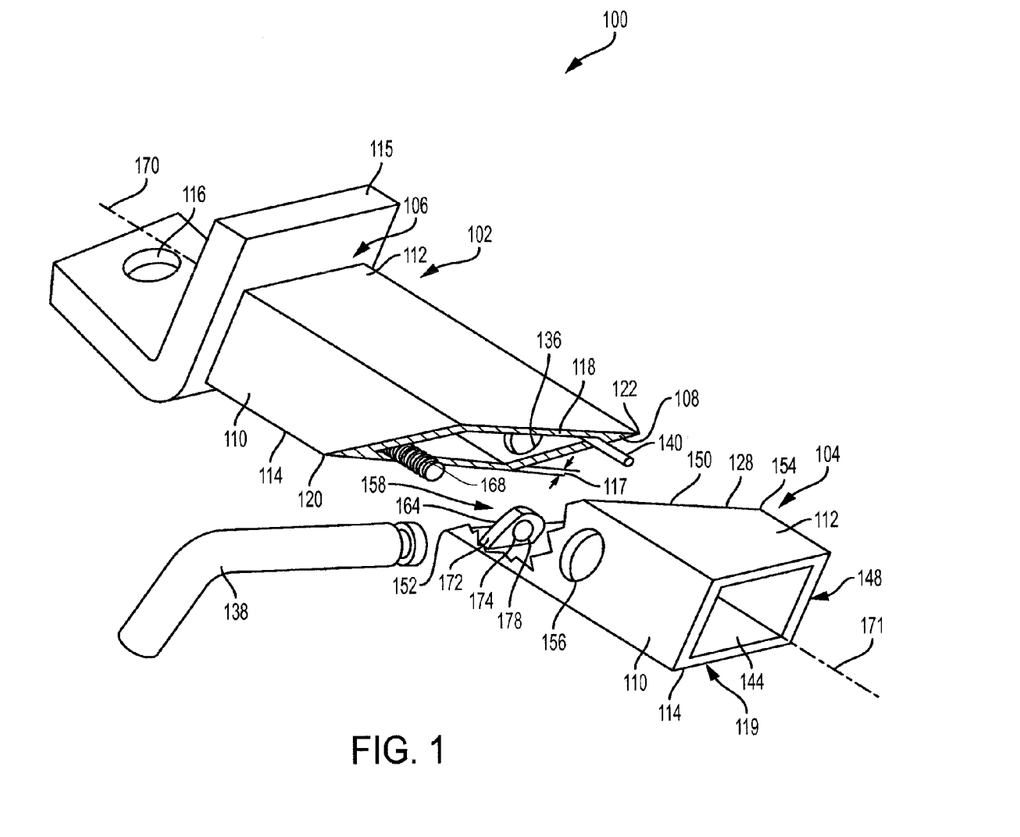
FIG. 1 is a perspective view of a hitch mount according to an embodiment of the present disclosure.
Figure 2:
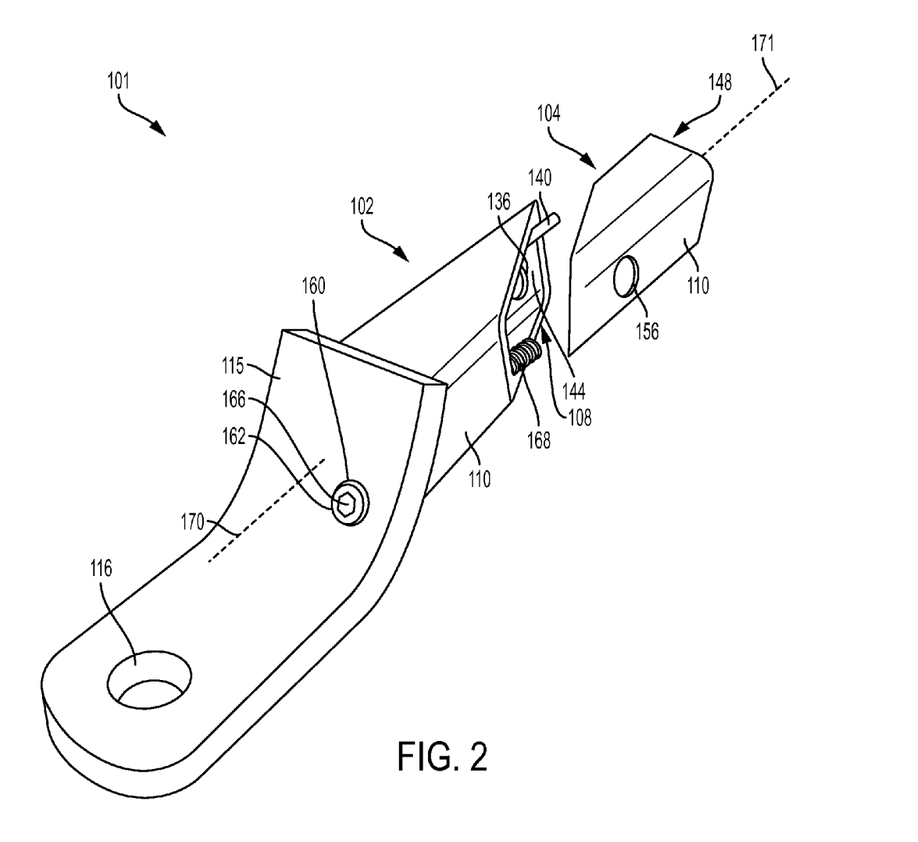
FIG. 2 is another perspective view of a hitch mount according to an embodiment of the present disclosure.

A perspective view of a hitch mount 100 accordingly to an embodiment of the present disclosure is shown in FIG. 1. Another perspective view of a hitch mount 101 accordingly to another embodiment of the present disclosure is shown in FIG. 2. Some embodiments of the present disclosure may include hitch mounts as described in U.S. patent application Ser. No. 14/503,989, filed Oct. 1, 2014, titled "TRAILER HITCH ASSEMBLIES AND RELATED METHODS" (hereinafter "the '989 Application"), the disclosure of which is incorporated in its entirety by this reference. For example, referring to FIGS. 1 and 2 together, in some embodiments, the hitch mounts 100, 101 may include a shank having a first tubular element 102, a second tubular element 104. The hitch mounts 100, 101 may further include a tongue 115, a security pin 138, at least one guide projection 140, an actuator 158, and an elongated bolt 160. The first and second tubular elements 102, 104 may be portions of a rectangular (e.g., square) tube. The first tubular element 102 may have a first end 106, a first angled end 108 opposite the first end 106, two sidewalls 110, an upper wall 112, a lower wall 114, and a first hole 136 extending through at least one of the sidewalls 110. The first tubular element 102 may further include a first edge 120 and a second edge 122. The second tubular element 104 may include a second end 148, a second angled end 128, two sidewalls 110, an upper wall 112, a lower wall 114, and a second hole 156 extending through at least one of the sidewalls 110 of the second tubular element 104. The second tubular element 104 may further include a third edge 152 and a fourth edge 154. Each of the tubular elements 102, 104 may have an interior surface 144.

The first end 106 of the first tubular element 102 may be attached to the tongue 115. The tongue 115 may include a mount hole 116 for attaching a trailer ball. In some embodiments, the walls 110, 112, 114 of each of the first tubular element 102 and the second tubular element 104 may have a wall thickness 117 of at least about 3/16 inch. The respective wall thicknesses 117 of the first tubular element 102 and of the second tubular element 104 may be at least substantially the same or may be different. For example, in some embodiments, the walls 110, 112, 114 of the first tubular element 102 and the second tubular element 104 may have the same wall thicknesses 117 of about 3/16 inch. In other embodiments, the walls 110, 112, 114 of the first tubular element 102 may have a wall thickness 117 of about 1/4 inch and the walls 110, 112, 114 of the second tubular element 104 may have a wall thickness 117 of about 3/16 inch. In some embodiments, both the first tubular element 102 and second tubular element 104 may have substantially equal respective external circumferences 119. In other embodiments, respective external circumferences 119 of the first tubular element 102 and second tubular element 104 may be different.

Each of the first tubular element 102 and second tubular element 104 may include a rectangular (e.g., square) tube that includes four longitudinally extending edges defined between adjacent walls of the sidewalls 110, upper wall 112, and lower wall 114. The first edge 120 of the first tubular element 102 may be at an intersection of the lower wall 114 and one of the sidewalls 110 of the first tubular element 102. The second edge 122 of the first tubular element 102 may be at an intersection of the upper wall 112 and the other of the sidewalls 110 of the first tubular element 102 and may be diagonally opposite the first edge 120. The first tubular element 102 may define a first central axis 170, which may extend generally centrally through the first tubular element 102. For example, the first central axis 170 may be centered between the upper and lower walls 112, 114 of the first tubular element 102 and centered between sidewalls 110 of the first tubular element 102.

The third edge 152 of the second tubular element 104 may be at an intersection of the lower wall 114 and one of the sidewalls 110 of the second tubular element 104. The fourth edge 154 of the second tubular element 104 may be at an intersection of the upper wall 112 and the other of the sidewalls 110 of the second tubular element 104 and may be diagonally opposite the third edge 152. The second tubular element 104 may include a second central axis 171, which may extend generally centrally through the second tubular element 104. For example, the second central axis 171 may be centered between the upper and lower walls 112, 114 of the second tubular element 104 and centered between sidewalls 110 of the second tubular element 104.

The first angled end 108 of the first tubular element 102 may include a first planar end surface 118 extending from a longitudinally backward extent to a longitudinally forward extent between diagonally opposite edges of the first tubular element 102. For example, the first planar end surface 118 may extend from the first edge 120 of the first tubular element 102 to the second edge 122 of the first tubular element 102. In other embodiments, the first planar end surface 118 may extend from a longitudinally backward extent to a longitudinally forward extent from one sidewall 110 of the first tubular element 102 to the other sidewall 110 of the first tubular element 102.

The second angled end 128 of the second tubular element 104 may include a second planar end surface 150 extending from a longitudinally backward extent to a longitudinally forward extent between diagonally opposite edges of the second tubular element 104. For example, the second planar end surface 150 may extend from the third edge 152 of the second tubular element 104 to the fourth edge 154 of the second tubular element 104. The second angled end 128 of the second tubular element 104 may be complementary in size and shaped to the first angled end 108 of the first tubular element 102.

As used herein, the term "complementary" means that one angled end is a complement of another angled end. In other words, the angled ends 108, 128 are so configured that when the two tubular elements 102, 104 are placed together along the angled ends 108, 128, the two tubular elements 102, 104 form two mutually completing parts of the hitch mounts 100, 101. Stated another way, the term "complementary" means that when two complementary pieces are placed together, the two complementary pieces form a whole. In the current disclosure, the first and second tubular elements 102, 104 form complementary pieces of the hitch mount 100. On the other hand, as used herein, the term "complementary" in reference to angles does not refer to the addition of the angles resulting in a right angle. Furthermore, the second planar end surface 150 of the second tubular element 104 may be complementary to the first planar end surface 118 of the first tubular element 102, such that the first and second planar end surfaces 118, 150 are parallel to each other when the first and second tubular elements 102, 104 are aligned.

As used herein, the term "aligned," when used in relation to a first tubular element 102 and a second tubular element 104, means having the first tubular element 102 placed next to the second tubular element 104 and having the first angled end 108 of the first tubular element 102 in direct contact with a second angled end 128 of the second tubular element 104. When the two tubular elements 102, 104 are aligned, the first central axis 170 of the first tubular element 102 and the second central axis 171 of the second tubular element 104 are collinear. In embodiments in which the first tubular element 102 and the second tubular element 104 are substantially the same shape and size in cross section, the term "aligned" further means that an upper wall 112 of the first tubular element 102 is at least substantially flush with an upper wall 112 of the second tubular element 104 and that a lower wall 114 of the first tubular element 102 is at least substantially flush with a lower wall 114 of the second tubular element 104.

In some embodiments, when the first tubular element 102 and the second tubular element 104 are aligned, the first edge 120 of the first tubular element 102 may be collinear with the third edge 152 of the second tubular element 104, and the second edge 122 of the first tubular element 102 may be collinear with the fourth edge 154 of the second tubular element 104. When the first tubular element 102 is aligned with the second tubular element 104 and prior to diagonal displacement and misalignment, the second angled end 128 and second planar end surface 150 may be sized and shaped such that the second planar end surface 150 may be in contact with the first planar end surface 118, and vice versa. Furthermore, when the first tubular element 102 is aligned with the second tubular element 104 and prior to diagonal displacement and misalignment, the first central axis 170 of the first tubular element 102 and the second central axis 171 of the second tubular element 104 may be collinear.

The first hole 136 of the first tubular element 102 may be substantially centered between the upper wall 112 and lower wall 114 of the first tubular element 102. Furthermore, the first hole 136 may be oriented along the longitudinal length of the first tubular element 102 between an end of the first edge 120 on the first angled end 108 and an end of the second edge 122 on the first angled end 108 of the first tubular element 102. In embodiments where the first planar end surface 118 extends from one sidewall 110 of the first tubular element 102 to the other sidewall 110 of the first tubular element 102, the first hole 136 may be oriented along the longitudinal length of the first tubular element 102 between the two sidewalls 110 on the first angled end 108 relative to the longitudinal length of the hitch mounts 100, 101.

Figure 6:
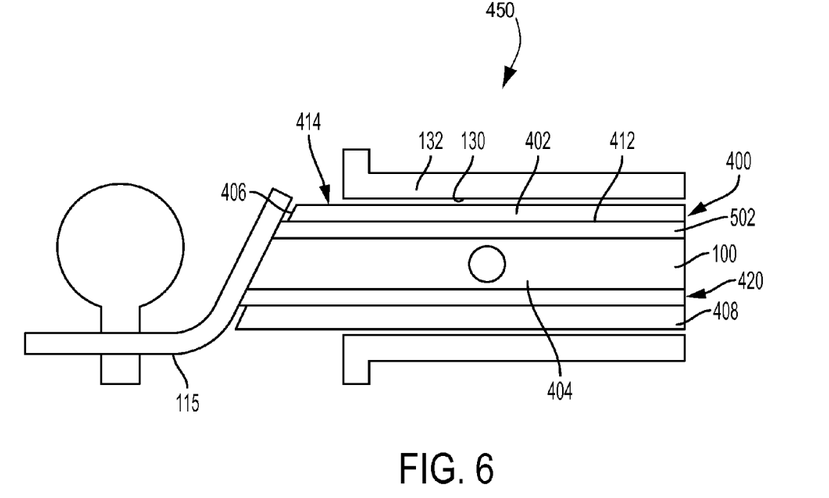
FIG. 6 is a cross sectional view of a hitch mount assembly including a hitch mount and the trailer hitch adapter of FIG. 5 inserted into a trailer hitch receiver in a first orientation.

The second hole 156 of the second tubular element 104 may be substantially centered between the upper wall 112 and lower wall 114 of the second tubular element 104. Furthermore, the second hole 156 may be oriented along the longitudinal length of the second tubular element 104 between an end of the third edge 152 on the second angled end 128 and an end of the fourth edge 154 on the second angled end 128 of the second tubular element 104. The second hole 156 may be oriented to be at least substantially concentric with the first hole 136 of the first tubular element 102 when the first tubular element 102 and the second tubular element 104 are aligned, such that the security pin 138 can simultaneously extend through both the first hole 136 and the second hole 156 while engaging a trailer hitch receiver 132 (FIG. 6). When the security pin 138 extends simultaneously through both the first hole 136 and the second hole 156 and engages the trailer hitch receiver 132 (FIG. 6), the first and second holes 136, 156 may have sufficient clearance around the security pin 138 to enable diagonal displacement and misalignment of the first tubular element 102 relative to the second tubular element 104. In some embodiments, the second hole 156 may have a larger diameter than a diameter of the first hole 136 of the first tubular element 102. The larger diameter of the second hole 156 may facilitate diagonal displacement of the first tubular element 102 relative to the second tubular element 104. In some embodiments, the first hole 136 and the second hole 156 may have the same diameter. In some embodiments, the first and second holes 136, 156 may have a circular, oval, square, or any other geometric shape. In some embodiments, the first and second holes 136, 156 may have different shapes in relation to each other.

The at least one guide projection 140 of the hitch mounts 100, 101 may be attached to an interior surface 144 of at least one of the two tubular elements 102, 104. The at least one guide projection 140 may longitudinally protrude at least partially from the angled end 108, 128 of the tubular element 102, 104 to which the at least one guide projection 140 is attached. For example, the first tubular element 102 may include at least one guide projection 140 protruding at least partially from the first angled end 108 of the first tubular element 102 and configured to enter at least partially into the second tubular element 104. In some embodiments, the at least one guide projection 140 may be a thin rod with a portion of the rod thinner than the remainder of the rod. The thinner portion of the rod may protrude from the first angled end 108 of first tubular element 102. In other embodiments, the at least one guide projection 140 may include, for example, a thin flat bar, tab, pin, bolt, and/or flange. The at least one guide projection 140 may be configured to assist in aligning the first tubular element 102 with the second tubular element 104.

The at least one guide projection 140 may be disposed and configured such that there is sufficient clearance between a protruding portion of the at least one guide projection 140 and the tubular element 102, 104 in which the protruding portion may be inserted to facilitate diagonal displacement and misalignment of the tubular elements 102, 104 relative to each other. In some embodiments, the at least one guide projection 140 may be secured within at least one of the two tubular elements 102, 104 such that upon actuation and diagonal displacement of the two tubular elements 102, 104 relative to one another, a portion of the at least one guide projection 140 extending into the tubular element to which the at least one guide projection 140 is not secured may be moved toward the central axis of the tubular element to which the at least one guide projection 140 is not secured. For example, the at least one guide projection 140 may be secured within the first tubular element 102 and when the two tubular elements 102, 104 are aligned, a portion of the at least one guide projection 140 may extend into the second tubular element 104. Upon actuation and diagonal displacement of the two tubular elements 102, 104 relative to one another, the portion of the at least one guide projection 140 extending into the second tubular element 104 may be moved toward the second central axis 171 of the second tubular element 104. In embodiments where at least one guide projection 140 is secured within both tubular elements 102, 104, upon actuation and diagonal displacement of the two tubular elements 102, 104 relative to one another, the at least one guide projection 140 secured within the first tubular element 102 and the at least one guide projection 140 secured within the second tubular element 104 move toward each other. The at least one guide projection 140 may be configured to facilitate keeping the first tubular element 102 and second tubular element 104 together and generally aligned through mechanical interference.

The actuator 158 of the second tubular element 104 may include a nut mount 164, the elongated bolt 160, a first actuator hole 162, and a second actuator hole 174. The nut mount 164 may be disposed within the second tubular element 104. The nut mount 164 may include a secured portion 172 and a nut 178. In some embodiments, the nut 178 may be omitted and the secured portion 172, itself, may be threaded. In some embodiments, the secured portion 172 may be secured to the interior surface 144 of the second tubular element 104 proximate the third edge 152 of the second tubular element 104. In other embodiments, the secured portion 172 may be secured to the interior surface 144 of another edge of the second tubular element 104. The elongated bolt 160 may have a head end 166 and a threaded end 168. The elongated bolt 160 may extend through the first tubular element 102 and may be configured to assist in bringing the two tubular elements 102, 104 longitudinally closer together. The first actuator hole 162 may extend through the tongue 115 of the first tubular element 102. In some embodiments, the first actuator hole 162 may be countersunk to accommodate the head end 166 of the elongated bolt 160. The second actuator hole 174 may extend through the secured portion 172 of the nut mount 164 and may be configured to receive the threaded end 168 of the elongated bolt 160. For example, in some embodiments, the second actuator hole 174 may include the nut 178 for receiving the threaded end 168 of the elongated bolt 160. When in use, the elongated bolt 160 may extend from the first actuator hole 162 in the tongue 115 of the first tubular element 102 to the nut mount 164 secured inside of the second tubular element 104.

In some embodiments, as shown in FIGS. 1 and 2, the first and second actuator holes 162, 174 in the tongue 115 and secured portion 172, respectively, may be defined to a side of the first and second central axes 170, 171 of the first and second tubular elements 102, 104, respectively. In other words, the first and second actuators holes 162, 174 may be closer in distance to one of the sidewalls 110 of the first and second tubular elements 102, 104 than to the other of the sidewalls 110 of the first and second tubular elements 102, 104. In some embodiments, the first and second actuator holes 162, 174 may be centered on the first and second central axes 170, 171.

In some embodiments, the elongated bolt 160 may serve as an additional guide projection. For example, the first and second actuator holes 162, 174 may be oriented such that when the elongated bolt 160 extends through the first tubular element 102, the elongated bolt 160 is proximate an edge of the first tubular element 102. In some embodiments, the elongated bolt 160 may be proximate an edge that is opposite an edge to which an at least one guide projection 140 is secured. Furthermore, the elongated bolt 160 may assist in aligning the first tubular element 102 with the second tubular element 104. Moreover, the elongated bolt 160 may be configured to facilitate keeping the first tubular element 102 and second tubular element 104 together and generally parallel (e.g., aligned) through mechanical interference.

In some embodiments, at least one magnet may be coupled to one or both of the first tubular element 102 and the second tubular element 104 to at least temporarily couple the first tubular element 102 to the second tubular element 104, to facilitate assembly thereof. By way of non-limiting example, the at least one guide projection 140 may be a magnet or the nut mount 164 may be a magnet. In some embodiments, the at least one magnet may be disposed within one or both of the first tubular element 102 and the second tubular element 104, such as proximate the at least one guide projection 140, proximate the elongated bolt 168, or proximate the nut mount 164, for example.

During use, the second end 148 of the second tubular element 104 may be insertable into the trailer hitch receiver 132 (FIG. 6). When the hitch mounts 100, 101 are inserted into the trailer hitch receiver 132, there may be some distance between the sidewalls 110, lower wall 114, and/or the upper wall 112 of either tubular element 102, 104 and interior walls 130 of the trailer hitch receiver 132 (FIG. 6). When the hitch mounts 100, 101 are inserted into the trailer hitch receiver 132 (FIG. 6), the threaded end 168 of the elongated bolt 160 may be engaged with the nut 178 of the nut mount 164 and the elongated bolt 160 may be turned with a tool. The turning of the elongated bolt 160 may bring the first tubular element 102 and the second tubular element 104 longitudinally closer together, if the two tubular elements 102, 104 were separated initially. The elongated bolt 160 may be turned at least until the first angled end 108 of the first tubular element 102 contacts the second angled end 128 of the second tubular element 104. Upon contact of the first angled end 108 of the first tubular element 102 with the second angled end 128 of the second tubular element 104, and upon continued turning of the elongated bolt 160, the first angled end 108 of the first tubular element 102 may slide along the second angled end 128 of the second tubular element 104. The sliding of the first tubular element 102 relative to the second tubular element 104 may result in diagonal and lateral displacement and misalignment of the first and second tubular elements 102, 104 relative to each other. The diagonal and lateral displacement and misalignment caused by sliding of the first tubular element 102 relative to the second tubular element 104 may reduce the distance between the sidewalls 110, lower wall 114, and/or the upper wall 112 of either tubular element 102, 104 and the interior walls 130 of the trailer hitch receiver 132 and may result in the sidewalls 110, upper wall 112, and/or lower wall 114 of one or both of the first and second tubular elements 102, 104 pressing against the interior walls 130 of the trailer hitch receiver 132 (FIG. 6). The contact of sidewalls 110, upper wall 112, and/or lower wall 114 of either tubular element 102, 104 against the interior walls 130 of the trailer hitch receiver 132 may increase stability and reduce (e.g., prevent) wobbling of the hitch mounts 100, 101 within the trailer hitch receiver 132 (FIG. 6) during use.

Conventional trailer hitches may have some wobble between the trailer hitch and the trailer hitch receiver when the trailer hitch is inserted in a trailer hitch receiver. The wobble from side to side of the trailer hitch within the trailer hitch may begin as a minute movement, and when a vehicle employing the trailer hitch is moving down a hill, the wobble may be increased exponentially as inertia moves the trailer back and forth. The magnified wobble at the back end of the trailer can result in the rear of the trailer swaying or "fish tailing" several feet, which, in turn, can be a dangerous side effect of hauling long trailers. Reducing the wobble of the trailer hitch within the trailer hitch receiver, due to the trailer hitch being secured in the above-described manner, may reduce the extent of sway or "fish tailing" that occurs at the back end of the trailer, and, thus, may increase the safety of hauling trailers, especially long trailers. Furthermore, providing contact between the walls of the hitch mounts 100, 101 and the interior walls 130 of the trailer hitch receiver 132 may add mechanical interference between the hitch mounts 100, 101 and trailer hitch receiver 132, which may reduce the likelihood of the hitch mounts 100, 101 being pulled out of the trailer hitch receiver 132 (FIG. 6) while pulling a trailer, should the security pin 138 fail or fall out or should a user forget to insert the security pin 138.

Figure 3:
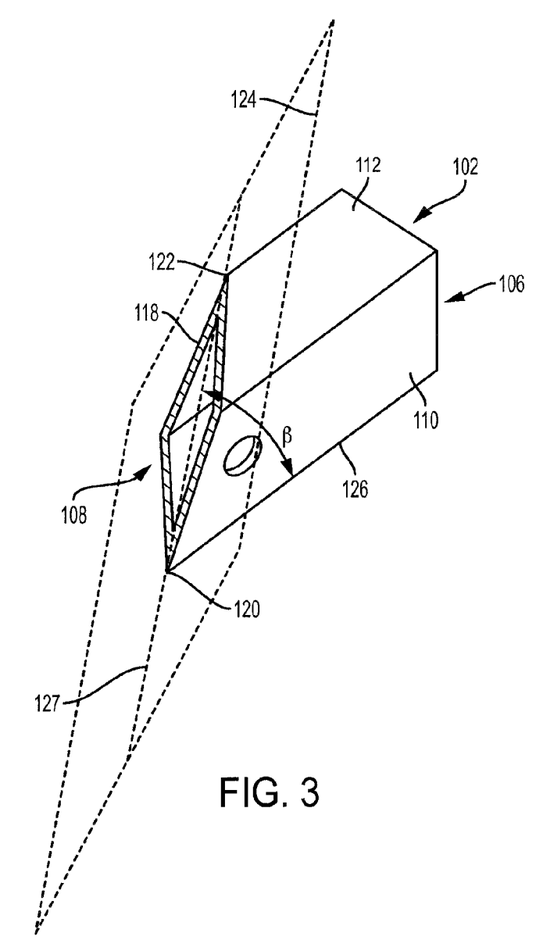
FIG. 3 is a perspective view of an angled end of a first tubular element of the hitch mount of FIG. 1.

FIG. 3 is a perspective view of the first angled end 108 of the first tubular element 102 of the hitch mount 100 according to an embodiment of the invention. Some features of the first tubular element 102 (e.g., guide projection 140, tongue 115 (FIGS. 1 and 2)) are not shown in FIG. 3 for clarity. As illustrated in FIG. 3, the first planar end surface 118 of the first angled end 108 of the first tubular element 102 may extend along a plane 124 (shown in broken lines). The first edge 120 of the first tubular element 102 may define a line 126 along the longitudinal length of the first tubular element 102. The plane 124 may include an imaginary line 127 extending in the plane 124 from the first edge 120 to the second edge 122 of the first tubular element 102. In some embodiments, an acute wedge angle β may be defined between the line 126 defined by the first edge 120 and the imaginary line 127 extending in the plane 124.

In embodiments where the first planar end surface 118 extends from one sidewall 110 of the first tubular element 102 to the other sidewall 110 of the first tubular element 102, the imaginary line 127 may extend from a middle of one sidewall 110 of the first tubular element 102 to a middle of another sidewall 110 of the first tubular element 102. In these embodiments, the acute wedge angle β may be defined between a sidewall 110 of first tubular element 102 and the imaginary line 127 extending in the plane 124.

In some embodiments, the acute wedge angle β may be less than about 90 degrees. In other embodiments, the acute wedge angle β may be less than 60 degrees. In other embodiments, the acute wedge angle β may be less than 45 degrees. In yet other embodiments, the acute wedge angle β may be less than 30 degrees. In some embodiments, the acute wedge angle β is configured such that the security pin 138 can extend simultaneously through both the first and second holes 136, 156 when the first and second tubular elements 102, 104 are aligned. In other embodiments, an obtuse angle may be defined between the line 126 defined by the first edge 120 and the imaginary line 127 extending in the plane 124.

Figure 4:
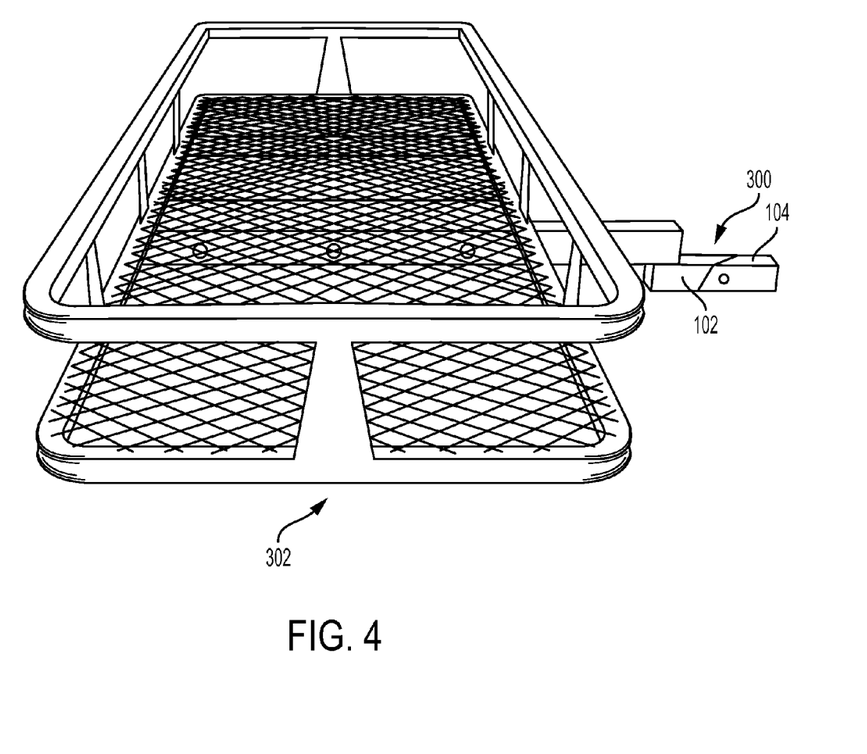
FIG. 4 is a perspective view of a hitch mount attached to a trailer hitch accessory according to an embodiment of the present disclosure.

FIG. 4 is a perspective view of a hitch mount 300 secured to a trailer hitch accessory 302 (e.g., a luggage rack). As shown, the first tubular element 102 and second tubular element 104 of the hitch mounts 100, 101 of FIGS. 1 and 2 may be secured to trailer hitch accessories 302 that are attached to vehicles through the trailer hitch receiver 132 (FIG. 6). For example, first tubular element 102 and second tubular element 104 may be attached to a luggage rack, motorcycle trailer, bicycle rack, wheel chair carrier, steps, etc. In some embodiments, the first tubular element 102 may be secured to a trailer hitch accessory 302 by welding the first tubular element 102 to the trailer hitch accessory 302. Furthermore, the first and second tubular elements 102, 104 may provide the same advantages for use with a trailer hitch accessory 302 as described in relation to the hitch mount 100 of FIGS. 1 and 2. For example, the first and second tubular elements 102, 104 may increase stability and reduce wobbling of the trailer hitch accessory 302.

Figure 5:
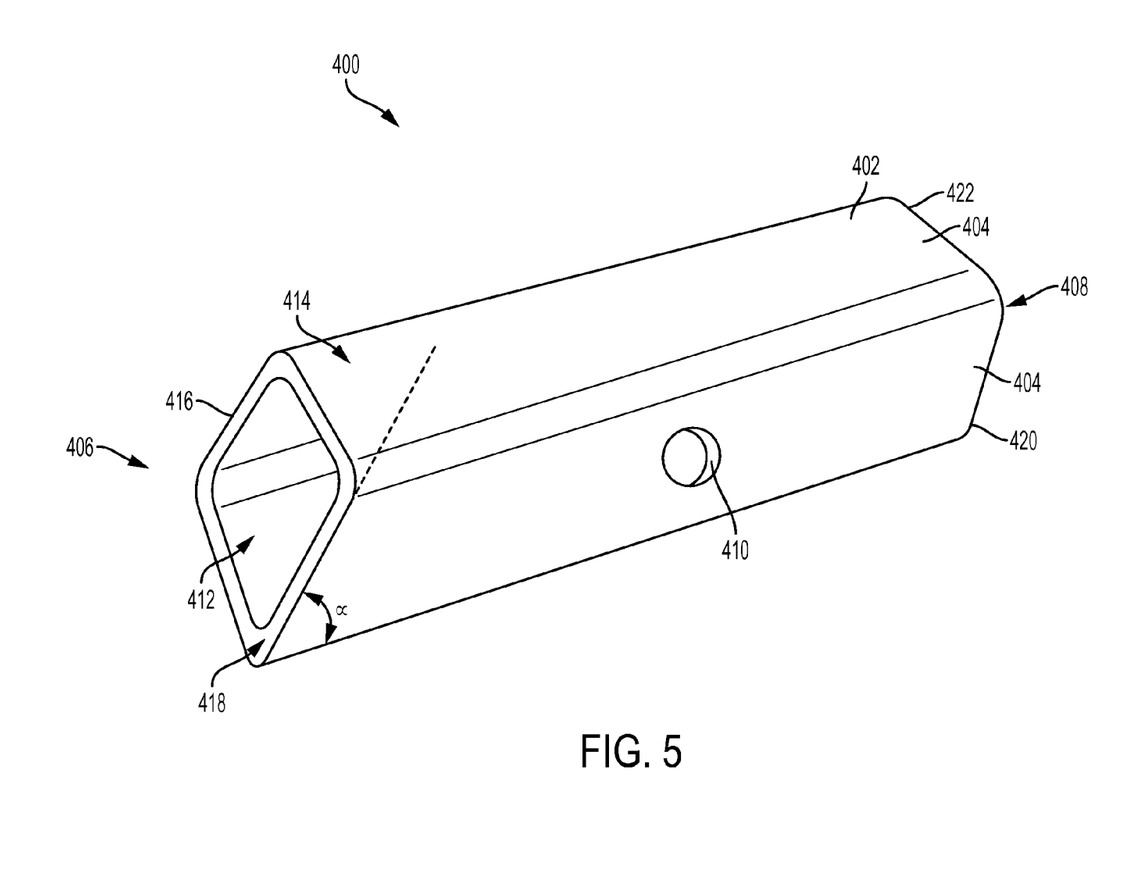
FIG. 5 is a perspective view of a trailer hitch adapter according to an embodiment of the present disclosure.

FIG. 5 is a perspective view of a trailer hitch adapter 400 according to an embodiment of the present disclosure. The trailer hitch adapter 400 may be configured to be inserted into a trailer hitch receiver 132 (FIG. 6) and to receive a hitch mount 100 (FIG. 1) therein. For example, the trailer hitch adapter 400 may facilitate using a certain sized hitch mount 100 (FIG. 1) (e.g., a 2-inch hitch mount 100) with a larger trailer hitch receiver 132 (FIG. 6) (e.g., a 2.5-inch trailer hitch receiver 132).

The trailer hitch adapter 400 may include a hollow sleeve 402 having four sidewalls 404, a first longitudinal end 406, a second longitudinal end 408, and holes 410 extending through two of the sidewalls 404. In some embodiments, the sleeve 402 may include a rectangular (e.g., square) tube defining a receiving aperture 412 extending longitudinally through the sleeve 402. The receiving aperture 412 of the sleeve 402 may be configured to receive at least a portion (e g, shank) of a hitch mount 100 (FIG. 1) therein. For example, the sleeve 402 may be usable with conventional hitch mounts or hitch mounts such as the hitch mount described in the '989 Application, which provides diagonal and lateral displacement and misalignment of the first and second tubular elements 102, 104 (FIG. 1) relative to each other in order to secure the hitch mount 100 (FIG. 1) within the sleeve 402.

In some embodiments, the first longitudinal end 406 of the sleeve 402 may include a third angled end 416 having a third planar end surface 418. The third planar end surface 418 may extend from one or more of the sidewalls 404 of the sleeve 402 at an acute sleeve angle α relative to an outer surface 414 of the one or more sidewalls 404. For example, the third angled end 416 may be defined by a first end plane oriented at the acute sleeve angle α to a longitudinal axis of the trailer hitch adapter 400. In other words, the third planar end surface 418 may extend from a first sidewall 404 of the sleeve 402 to a second sidewall 404 of the sleeve 402 at an acute sleeve angle α relative to an outer surface 414 of the first sidewall 404 of the sleeve. Stated another way, the third angled end 416 of the first longitudinal end 406 of the sleeve 402 may have a wedge shape. Due to the third angled end 416, the sleeve 402 may have a sidewall 404 that is longer than the other sidewalls 404 (hereinafter "the longer sidewall"). As explained below with reference to FIGS. 6 and 7, the acute sleeve angle α may be configured to be complementary to an angle of a tongue 115 (FIG. 2) or other feature of the hitch mount 101 (FIG. 2). For example, in some embodiments, the acute sleeve angle α may be within a range of about 45° to about 60°. In some embodiments, the acute sleeve angle α may be within a range of about 60° to about 75°. In some embodiments, the acute sleeve angle α may be within a range of about 75° to about 85°. In some embodiments, the acute sleeve angle α may be at least about 63°.

In some embodiments, the second longitudinal end 408 of the sleeve 402 may include a square end 420 having a fourth planar end surface 422. The fourth planar end surface 422 may extend from each of the four sidewalls 404 in a direction at least substantially perpendicular to the outer surfaces 414 of the four sidewalls 404 of the sleeve 402. For example, the square end 420 may comprise an orthogonal end defined by a second end plane that is orthogonal to the longitudinal axis of the trailer hitch adapter 400.

Referring to FIGS. 1, 2, and 5 together, the holes 410 of the sleeve 402 may be oriented to receive a security pin 138 to secure the sleeve 402 within a trailer hitch receiver 132 (FIG. 6). For example, the holes 410 may extend through two sidewalls 404 that are parallel to each other, and the holes 410 may be concentric such that the security pin 138 may extend through the holes 410 simultaneously. Furthermore, the holes 410 may be oriented to be concentric with the first and second holes 136, 156 of a hitch mount 100 and holes in a trailer hitch receiver 132 (FIG. 6) such that the security pin 138 may extend through the all the holes simultaneously. Diameters of the holes 410 of the sleeve 402 may be larger than an outer diameter of the security pin 138. Having a larger diameter than the outer diameter of the security pin 138 may provide sufficient clearance around the security pin 138 to enable diagonal displacement and misalignment of the first tubular element 102 relative to the second tubular element 104 of the hitch mount 100, when using the sleeve 402 with a hitch mount 100 such as the hitch mounts described in the '989 Application. Furthermore, in some embodiments, the diameters of the holes 410 may be larger than diameters of the first and second holes 136, 156 of the hitch mount 100.

In some embodiments, the trailer hitch adapter 400 may be configured to facilitate using a 2-inch hitch mount with a 2.5-inch trailer hitch receiver 132 (FIG. 6). For example, in some embodiments, the sidewalls 404 of the sleeve 402 may have a thickness of at least substantially a quarter inch (0.25 inch) such that the sidewalls 404 of the sleeve 402 at least substantially fill a space between hitch mount 100 and interior walls 130 (FIG. 6) of the trailer hitch receiver 132 (FIG. 6).

Figure 7:
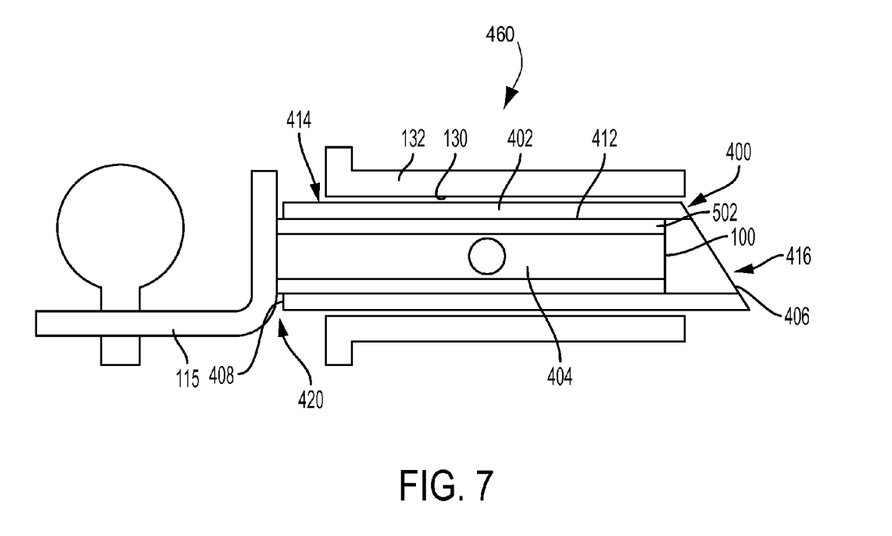
FIG. 7 is a cross sectional view of a hitch mount assembly including a hitch mount the trailer hitch adapter of FIG. 5 inserted into a trailer hitch receiver in a second orientation.

FIG. 6 is a cross-sectional view of a hitch mount assembly 450 including a hitch mount 100 and the trailer hitch adapter 400 of FIG. 5 inserted into a trailer hitch receiver 132 in a first orientation. FIG. 7 is a cross-sectional view of a hitch mount assembly 460 including a hitch mount 100 and the trailer hitch adapter 400 of FIG. 5 inserted into the trailer hitch receiver 132 in a second orientation. Referring to FIGS. 6 and 7 together, either longitudinal end 406, 408 of the adapter 402 may be insertable into the trailer hitch receiver 132. Being capable of having either end (e.g., first or second longitudinal ends 406, 408) inserted into the trailer hitch receiver 132 may allow the adapter 402 to accommodate hitch mounts 100 with tongues 115 having different shapes.

For example, in some embodiments, the square end 420 of the second longitudinal end 408 of the sleeve 402 may be inserted into the trailer hitch receiver 132, and the third angled end 416 of the first longitudinal end 406 of the sleeve 402 may protrude from the trailer hitch receiver 132. Having the third angled end 416 of the first longitudinal end 406 of the sleeve 402 protrude from the trailer hitch receiver 132 may allow the sleeve 402 to accommodate a hitch mount 100 that has a tongue 115, which is not mounted orthogonal to but at an angle relative to a longitudinal length to a shank 502 (i.e., a portion of the hitch mount 100 that extends from the tongue 115 and is insertable into a trailer hitch receiver 132) of the hitch mount 100. The third angled end 416 of the first longitudinal end 406 of the sleeve 402 may be complementary to (e.g., abut against) the tongue 115 of a hitch mount 100 when the shank 502 of the hitch mount 100 is inserted into the receiving aperture 412 of the sleeve 402. In some embodiments, when the shank 502 of the hitch mount 100 is inserted into the receiving aperture 412 of the sleeve 402, the sleeve 402 may cover at least substantially all of the shank 502 of the hitch mount 100. Such a configuration may permit 2.5-inch trailer hitch attachments such as mud flap assemblies to be used in conjunction with (e.g., attached to, coupled around) a 2-inch hitch mount 100. For example, the sleeve 402 provides a portion that extends from the trailer hitch receiver 132, and attachments designed to be mounted on a 2.5-inch hitch mount 100 may be mounted to that portion. Furthermore, the sleeve 402 may increase an overall strength of the hitch mount 100 by covering at least substantially all of the shank 502 of the hitch mount 100.

In other embodiments, as depicted in FIG. 7, the third angled end 416 of the first longitudinal end 406 of the sleeve 402 may be inserted into the trailer hitch receiver 132, and the square end 420 of the second longitudinal end 408 of the sleeve 402 may protrude from the trailer hitch receiver 132. Having the square end 420 of the second longitudinal end 408 of the sleeve 402 protruding from the trailer hitch receiver 132 may allow the sleeve 402 to accommodate a hitch mount 100 having a tongue 115 or other attachment that is mounted orthogonal to the longitudinal length of the shank 502 of the hitch mount 100. Again, the square end 420 may be complementary to (e.g., configured to abut against) the tongue 115 of a hitch mount 100 when the shank 502 of the hitch mount 100 is inserted into the receiving aperture 412 of the sleeve 402. When the shank 502 of the hitch mount 100 is inserted into the receiving aperture 412 of the sleeve 402, the sleeve 402 may cover at least substantially all of the shank 502 of the hitch mount 100. Again, such a configuration may permit 2.5-inch trailer hitch attachments to be used in conjunction with a 2-inch hitch mount 100. Again, the sleeve 402 may also increase an overall strength of the hitch mount 100 by covering at least substantially all of the shank 502 of the hitch mount.

Referring to FIGS. 5, 6, and 7 together, in other embodiments, either the square end 420 or third angled end 416 of the sleeve 402 may be sized and shaped to expose at least a portion of the shank 502 of the hitch mount 100, which may be inserted into the receiving aperture 412 of the sleeve 402. In other words, in some embodiments, a portion of the sleeve 402 extending longitudinally from the holes 410 to the square end 420 may be shorter than a portion of the sleeve 402 extending longitudinally from the holes 410 to the third angled end 416. In such embodiments, when the third angled end 416 of the sleeve 402 is inserted into the trailer hitch receiver 132, the square end 420 of the sleeve 402 may be substantially flush or recessed from an outer end of the trailer hitch receiver 132, to expose a portion of the shank 502 of the hitch mount 100 extending from the trailer hitch receiver 132. In other embodiments, a portion of the sleeve 402 extending longitudinally from the holes 410 to the third angled end 416 may be shorter than a portion of the sleeve 402 extending longitudinally from the holes 410 to the square end 420. Such configurations may permit 2-inch trailer hitch attachments such as mud flap assemblies to be used in conjunction with a 2-inch hitch mount 100 and 2.5-inch trailer hitch receiver 132. For example, the sleeve 402 may expose a portion of the shank 502 of the hitch mount 100 that extends from the trailer hitch receiver 132, and attachments designed to be mounted on a 2-inch hitch mount 100 may be mounted on that portion.

In some embodiments, the longer sidewall 404 of the sleeve 402 may have a longitudinal length within a range of about 9 to about 10 inches. For example, in some embodiments, the longer wall 404 of the sleeve 402 may have a longitudinal length of at least about 9.6 inches. In other embodiments, the longer wall 404 of the sleeve 402 may have a longitudinal length within a range of about 8 to about 9 inches. In some embodiments, a distance between a center of the holes 410 in parallel sidewalls 404 of the sleeve 402 and the fourth planar end surface 422 of the square end 420 of the second longitudinal end 408 of the sleeve 402 may be within a range of about 4 to about 5 inches. For example, in some embodiments, a distance between a center of the holes 410 in the parallel sidewalls 404 of the sleeve 402 and the fourth planar end surface 422 of the square end 420 of the second longitudinal end 408 of the sleeve 402 may be at least about 4.2 inches. In some embodiments, a distance between an outer surface 414 of a sidewall 404 of the sleeve 402 and an outer surface 414 of an opposite parallel sidewall 404 may be at least about 2.5 inches.

Figure 8:
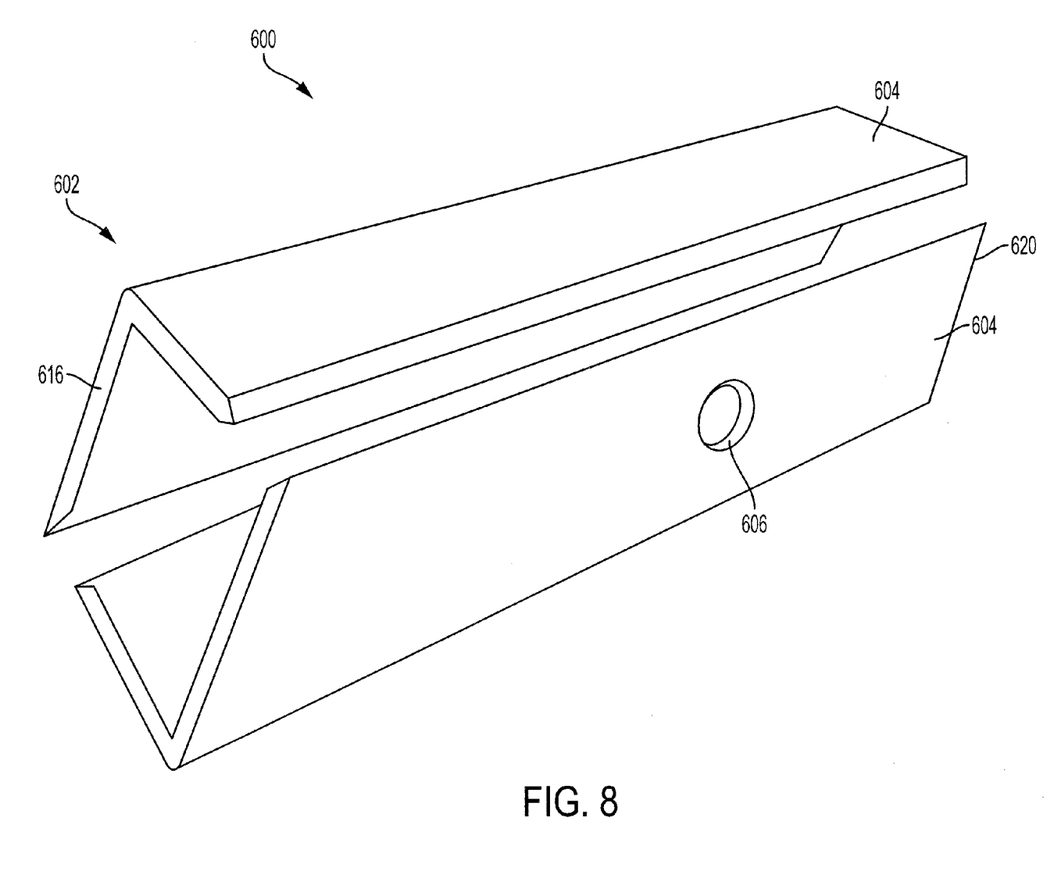
FIG. 8 is a perspective view of a trailer hitch adapter according to another embodiment of the present disclosure.

A perspective view of a trailer hitch adapter 600 according to another embodiment of the present disclosure is shown in FIG. 8. In some embodiments, the trailer hitch adapter 600 may include two L-shaped members 604 (e.g., angle irons) that can be aligned together to form an adjustable sleeve 602 similar to the non-adjustable sleeve 402 of the trailer hitch adapter 400 of FIGS. 6 and 7. The two L-shaped members 604 may be complementary to each other. In some embodiments, the two L-shaped members 604 may be two halves of a rectangular (e.g., square) tube, cut lengthwise and along opposing corners of the rectangular tube. The trailer hitch adapter 600 may include the trailer hitch adapter 400 of FIGS. 6 and 7, but wherein the trailer hitch adapter 600 is formed of two U-shaped members 604. Stated another way, the adjustable sleeve 602 may comprise two complementary members that are each L-shaped in cross section. Each L-shaped member 604 may include a hole 606 for receiving a security pin 138 (FIG. 1), wherein the holes 606 of the two L-shaped members 604 are configured to be located along an axis such that a straight pin may be inserted through the holes 606 when the adjustable sleeve 602 is oriented to be used to stabilize a hitch mount 100 (FIG. 1).

Referring to FIGS. 1, 6, and 8 together, when the adjustable sleeve 602 is used in conjunction with the hitch mount 100 of FIG. 1 or one of the hitch mounts described in the '989 Application, the trailer hitch adapter 600 may allow for diagonal and lateral displacement and misalignment of the first and second tubular elements 102, 104 relative to each other and diagonal and lateral displacement and misalignment of the L-shaped members 604 relative to one another. For example, one of the L-shaped members 604 of the trailer hitch adapter 600 may move with the first tubular element 102 and one of the L-shaped members 604 of the trailer hitch adapter 600 may move with second tubular element 104 of the hitch mount 100 when the first and second tubular elements 102, 104 are diagonally and laterally displaced and misaligned relative to each other. Using the adjustable sleeve 602 may result in a tighter and more secure fit within the trailer hitch receiver 132 when compared with a sleeve 402 that does not expand or move with the first tubular element 102 and second tubular element 104 of the hitch mount 100. For example, a sleeve 402 that does not expand or displace with the hitch mount 100 of FIG. 1 may allow for a tight and secure fit of the hitch mount 100 within the sleeve 402, but may not improve the fit of the sleeve 402 within the trailer hitch receiver 132. Accordingly, the sleeve 402 may move about within the trailer hitch receiver 132, possibly leading to wobbling and "fishtailing." On the other hand, an adjustable sleeve 602 that does expand or displace with the hitch mounts 100, 101 of FIGS. 1 and 2 may improve the fit of the hitch mount 100, 101 within the adjustable sleeve 602 and the fit of the adjustable sleeve 602 within trailer hitch receiver 132. Furthermore, an adjustable sleeve 602 that does expand or displace within the hitch mount 100 of FIG. 1 may facilitate using a 2-inch hitch mount 100 within a 2.5-inch trailer hitch receiver 132 while maintaining the advantages of an expandable hitch mount as described in the '989 Application. For example, the adjustable sleeve 602 may increase stability and reduce (e.g., prevent) wobbling of the hitch mount 100 and adjustable sleeve 602 within the trailer hitch receiver 132. Furthermore, the adjustable sleeve 602 may enable using different sized hitch mounts with trailer hitch receivers 132 of differing sizes.

The adjustable sleeve 602 may have a third angled end 616 and a square end 620 similar to the third angled end 416 and square end 420 of sleeve 402 described above with reference to FIGS. 6 and 7. Furthermore, the adjustable sleeve 602 may provide the same advantages described in relation to the sleeve 402 of FIGS. 6 and 7. For example, third angled end 616 and square end 620 of the adjustable sleeve 602 may be insertable into a trailer hitch receiver 132, and the adjustable sleeve 602 may accommodate hitch mounts 100 with tongues 115 having different shapes and configurations. As a result, the adjustable sleeve 602 may be able to accommodate a hitch mount 100 that has a tongue 115 that is not mounted orthogonal to, but at an angle relative to, a longitudinal length of the shank 502 of the hitch mount 100. Furthermore, as a result, the adjustable sleeve 602 may be able to accommodate a hitch mount 100 having a tongue 115 that is mounted orthogonal to the longitudinal length of the shank 502 of the hitch mount 100. Moreover, the adjustable sleeve 602 may permit 2.5-inch trailer hitch attachments to be used in conjunction with a 2-inch hitch mount 100.

In some embodiments, the adjustable sleeve 602 may not comprise two L-shaped members 604 but, rather, may include a plurality of plates that may be oriented around the shank 502 of the hitch mount 100 the trailer hitch receiver 132. At least one plate of the plurality of plates may include at least one hole for receiving the security pin 138.

Figure 9:
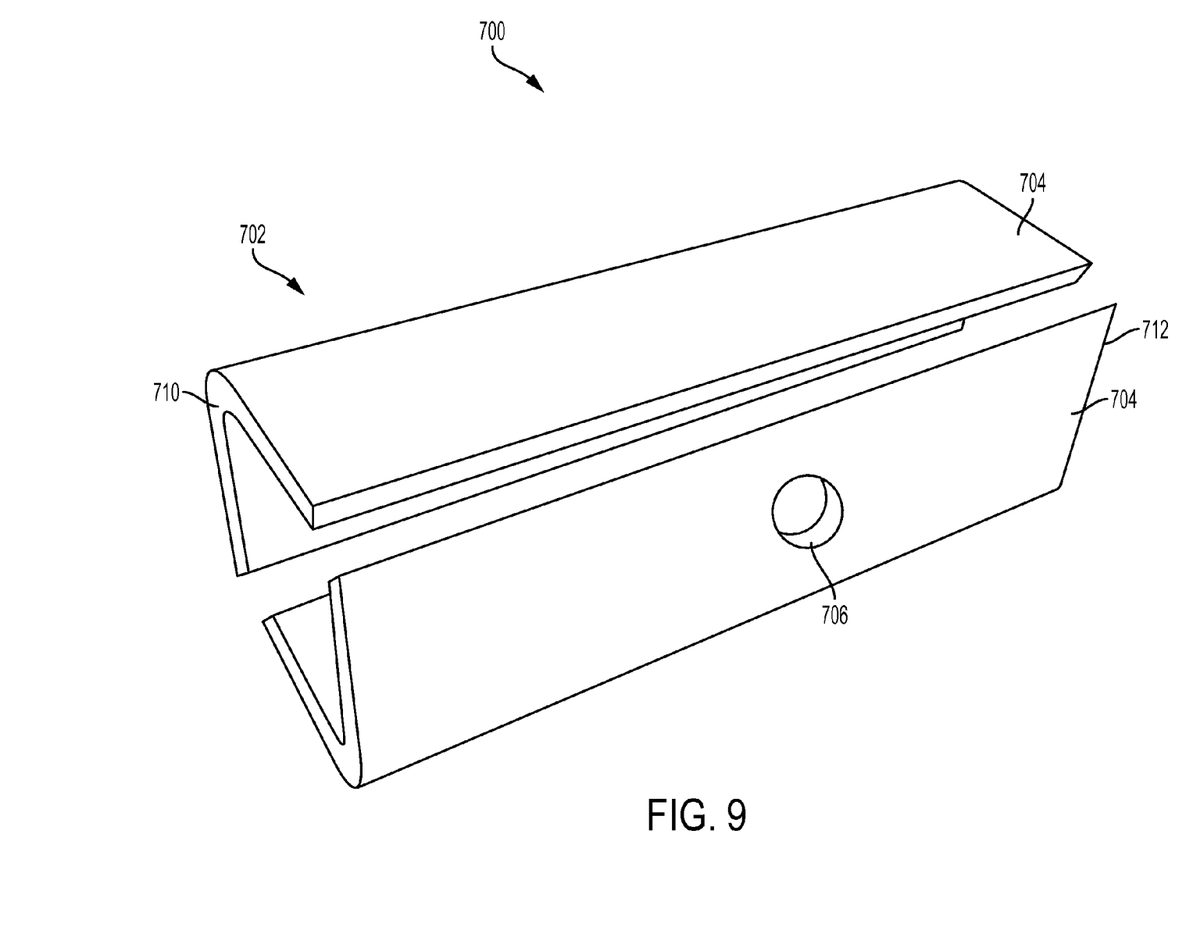
FIG. 9 is a perspective view of a trailer hitch adapter according to another embodiment of the present disclosure.

FIG. 9 is a perspective view of a trailer hitch adapter 700 according to another embodiment of the present disclosure. The trailer hitch adapter 700 may be similar to the trailer hitch adapter 600 of FIG. 8 and may include two L-shaped members 704 (e.g., angle irons) that can be aligned together to form an adjustable sleeve 702. Each L-shaped member 704 may include a hole 706 for receiving a security pin 138 (FIG. 1), wherein the holes 706 of the two L-shaped members 704 are configured to be at least substantially aligned with each other when the adjustable sleeve 702 is oriented to be used to stabilize a hitch mount 100 (FIG. 1). However, unlike the adjustable sleeve 602 of FIG. 8, as shown in FIG. 9, the adjustable sleeve 702 may include a first square end 710 and a second opposite square end 712 and may not include an angled end. In other words, the adjustable sleeve 702 may include a first orthogonal end defined by a third end plane that is orthogonal to the longitudinal axis of the trailer hitch adapter 700 and a second orthogonal end defined by a second end plane that is orthogonal to the longitudinal axis of the trailer hitch adapter 700. Furthermore, the adjustable sleeve 702 may not protrude from a trailer hitch receiver 132 (FIG. 6) when inserted into the trailer hitch receiver 132 (FIG. 6) and used as a trailer hitch adapter 700. In other words, a longitudinal length of the adjustable sleeve 702 may be selected to position the first or second square end 710, 712 substantially flush or recessed from an outer end of the trailer hitch receiver 132 (FIG. 6). For example, in some embodiments, the adjustable sleeve 702 may have a longitudinal length that is less than about 7 inches. In some embodiments, the adjustable sleeve 702 may have a longitudinal length less than about 6.5 inches. In some embodiments, the adjustable sleeve 702 may have a longitudinal length less than about 6 inches. In some embodiments, the adjustable sleeve 702 may have a longitudinal length of at least about 6.1 inches.

Referring to FIGS. 1 and 9 together, when the adjustable sleeve 702 is used in conjunction with the hitch mount 100 of FIG. 1 or one of the hitch mounts described the '989 Application, the trailer hitch adapter 700 may allow for diagonal and lateral displacement and misalignment of the first and second tubular elements 102, 104 relative to each other and diagonal and lateral displacement and misalignment of the L-shaped members 704 relative to one another. For example, one of the L-shaped members 704 of the trailer hitch adapter 700 may move with the first tubular element 102 and one of the L-shaped members 704 of the trailer hitch adapter 700 may move with second tubular element 104 of the hitch mount 100 when the first and second tubular elements 102, 104 are diagonally and laterally displaced and misaligned relative to each other. Using the adjustable sleeve 702 may result in a tighter more secure fit within the trailer hitch receiver 132 (FIG. 6) when compared with a hollow sleeve 402 (FIG. 5) that does not expand or move with the first tubular element 102 and second tubular element 104 of the hitch mount 100. Furthermore, the adjustable sleeve 702 may facilitate using a 2-inch hitch mount 100 within a 2.5-inch trailer hitch receiver 132 (FIG. 6) while maintaining the advantages of an expandable hitch mount as described in the '989 Application. For example, the adjustable sleeve 702 may increase stability and reduce (e.g., prevent) wobbling of the hitch mount 100 and adjustable sleeve 702 within the trailer hitch receiver 132. Furthermore, the adjustable sleeve 702 enables the use of different sized hitch mounts with trailer hitch receivers of differing sizes.

The example embodiments of the disclosure described above do not limit the scope of the invention, since these embodiments are merely examples of embodiments of the invention, which is defined by the scope of the appended claims and their legal equivalents. Any equivalent embodiments are intended to be within the scope of this invention. Indeed, various modifications of the disclosure, in addition to those shown and described herein, such as alternative useful combinations of the elements described, will become apparent to those skilled in the art from the description. Such modifications and embodiments are also intended to fall within the scope of the appended claims.

What is claimed is:

1. A hitch mount assembly, comprising:
   a trailer hitch receiver;
   a hitch mount inserted into the trailer hitch receiver and comprising:
      a first tubular element having a first angled end surface; and
      a second tubular element having a second angled end surface,
      wherein the second angled end surface of the second tubular element is complementary in size and shape to the first angled end surface of the first tubular element, and
      wherein first tubular element is as least substantially aligned with the second tubular element, the first angled end surface of the first tubular element being in contact with the second angled end surface of the second tubular element; and
   a hollow sleeve comprising a first elongated member that is L-shaped in cross section and a complementary second elongated member that is L-shaped in cross section, the hollow sleeve positioned to at least partially fill a space between an exterior surface of the hitch mount and an interior surface of the trailer hitch receiver.

2. The hitch mount assembly of claim 1, wherein the hollow sleeve has a longitudinal length such that the hollow sleeve does not protrude from the trailer hitch receiver.

3. The hitch mount assembly of claim 1, wherein the hollow sleeve has a first longitudinal end portion and a second longitudinal end portion, wherein the first longitudinal end portion comprises an angled end surface lying in a plane oriented at an acute angle to a longitudinal axis of the hollow sleeve.

4. The hitch mount assembly of claim 1, wherein the first tubular element of the hitch mount is laterally movable relative to second tubular element of the hitch mount.

5. The hitch mount assembly of claim 4, wherein the hitch mount is configured to laterally expand and to laterally move at least the first elongated member that is L-shaped cross section against an inner surface of the trailer hitch receiver.

6. The hitch mount assembly of claim 1, wherein the hollow sleeve is sized and shaped to cover at least substantially all of the first tubular element and the second tubular element of the hitch mount.

7. The hitch mount assembly of claim 5, wherein when the first tubular element of the hitch mount is laterally moved relative to the second tubular element of the hitch mount, at least a portion of either the first elongated member or the second elongated member is in contact with the inner surface of the trailer hitch receiver along at least substantially an entire longitudinal length of the hollow sleeve of the hitch mount assembly.

8. The hitch mount assembly of claim 1, wherein each of the first elongated member and the second elongated member has a thickness of at least about a quarter inch.

9. The hitch mount assembly of claim 3, wherein the second longitudinal end portion of the hollow sleeve comprises an orthogonal end surface lying in a plane that is substantially orthogonal to a longitudinal axis of the hollow sleeve.

10. The hitch mount assembly of claim 1, wherein the hitch mount further comprises a tongue attached to an end of the first tubular element opposite the first angled end surface.

11. A hitch mount assembly, comprising:
    a trailer hitch receiver;
    a hitch mount inserted into the trailer hitch receiver; and
    a hollow sleeve comprising a first elongated member that is L-shaped in cross section and a complementary second elongated member that is L-shaped in cross section, the hollow sleeve positioned to at least partially fill a space between an exterior surface of the hitch mount and an interior surface of the trailer hitch receiver,
    wherein the hollow sleeve has a first longitudinal end portion and a second longitudinal end portion, wherein the first longitudinal end portion comprises an angled end surface lying in a plane oriented at an acute angle to a longitudinal axis of the hollow sleeve.

* * * * *